United States Patent [19]

Fukuta et al.

[11] Patent Number: 4,643,383
[45] Date of Patent: Feb. 17, 1987

[54] MANUAL SEAT ADJUSTER

[75] Inventors: Kinsho Fukuta, Chiryu; Shiro Sasaki, Toyota, both of Japan

[73] Assignee: Toyota Jidosha Kabushiki Kaisha, Aichi, Japan

[21] Appl. No.: 764,969

[22] Filed: Aug. 12, 1985

Related U.S. Application Data

[63] Continuation of Ser. No. 515,634, Jul. 20, 1983, abandoned.

[30] Foreign Application Priority Data

Oct. 12, 1982 [JP] Japan .................................. 57-154851

[51] Int. Cl.$^4$ ................................................. E01B 7/00
[52] U.S. Cl. ........................................ 248/396; 248/421
[58] Field of Search .............. 248/421, 396, 397, 394, 248/419, 371; 297/313, 325, 330

[56] References Cited

U.S. PATENT DOCUMENTS

| | | | |
|---|---|---|---|
| 2,921,621 | 1/1960 | Williams | 248/421 |
| 2,942,647 | 6/1960 | Pickles | 248/421 |
| 3,149,815 | 9/1964 | Cotter | 248/421 |
| 3,188,044 | 6/1965 | Epple | 248/419 |
| 4,159,095 | 6/1979 | Pallant | 248/396 |
| 4,339,103 | 7/1982 | Mori | 297/328 |
| 4,422,611 | 12/1983 | Kitsuida | 248/394 |
| 4,529,159 | 7/1985 | Terada | 248/421 |

FOREIGN PATENT DOCUMENTS

| | | | |
|---|---|---|---|
| 2042978 | 10/1973 | Fed. Rep. of Germany | 248/396 |
| 2659308 | 7/1978 | Fed. Rep. of Germany | 248/421 |

OTHER PUBLICATIONS

Japanese Laid Open Patent Publication Sho 52-153526.

*Primary Examiner*—Reinaldo P. Machado
*Assistant Examiner*—Alvin Chin-Shue
*Attorney, Agent, or Firm*—Parkhurst & Oliff

[57] ABSTRACT

A vehicle seat adjusting means for differentiating the seat height value at longitudinal points of a seat to compensate for differing passenger physiques. The apparatus comprises a handle which is manually actuated and operatively connected to an input shaft of an anti-back drive coupling and linkage means which are located at the front and rear portions of the seat. The effective length of the rear link is adapted to be longer than that of the front link in order to lift the rear portion of seat more than the front portion.

8 Claims, 9 Drawing Figures

MANUAL SEAT ADJUSTER

This is a continuation of application Ser. No. 515,634 filed July 20, 1983, now abandoned.

BACKGROUND OF THE INVENTION

The present invention relates to seat adjusters used in a motor vehicle and more particularly to those adjusters which provide for improved height adjustments of the seat through the manual movement of linkages. Such manual vertical seat adjusters are adapted to adjust upward and downward to a specific height depending upon the passenger's personal preferences. U.S. Pat. No. 3,149,815 "Manual Seat Adjuster", the entire disclosure of which is hereby incorporated by reference, discloses a seat adjuster constructed such that the frame of the vehicles seat could be displaced upward and downward through the use of linkage means provided on the front and rear portions of the seat and supported by brackets fixed to the vehicle floor. The U.S. patent also discloses a so-called "anti-back drive" system.

In the known vertical seat adjusting device, the linkage provided for moving the vehicle seat was designed to lift the vehicle seat while retaining a parallel horizontal seat plane. However, when taking a passenger's comfort into consideration, it is preferable to have the rear of the seat lifted higher than the front of the seat. The prior art does not show any consideration given to the thought of a staggered vertical lift of a passenger seat in order to provide for more passenger comfort.

Therefore, the conventionally known device has disadvantages in that a passenger seated in the vehicle cannot get into a comfortable position on the vehicle's seat.

SUMMARY OF THE INVENTION

The present invention was made in view of the foregoing background and to overcome the foregoing drawbacks. It is accordingly an object of this invention to provide an improved seat height adjuster.

To attain the above objects, an apparatus according to the present invention comprises:

an upper support member adapted to support a seat;
a lower support member adapted to be secured to a supporting surface;
pivotably adjustable linkage means which vertically interconnects the left and right side of the seat, comprising;
first linkage means provided in the front portion of the seat for adjusting the height of the front portion of the seat,
second linkage means provided in the rear portion of the seat for adjusting the height of the rear portion of the seat,
connection means which operatively connect the first linkage means to the second linkage means,
control means at the front and rear of the seat for adjusting the clearance between the bottom of the seat and a vehicle floor;
a bi-directional, anti-back drive coupling; the coupling having an input shaft and an output shaft, and; a handle which is manually actuated and operatively connected to the input shaft for purposes of applying torque thereto.

BRIEF DESCRIPTION OF THE DRAWINGS

The above objects, features and advantages of the present invention will become more apparent form the following description of the preferred embodiments taken in connection with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
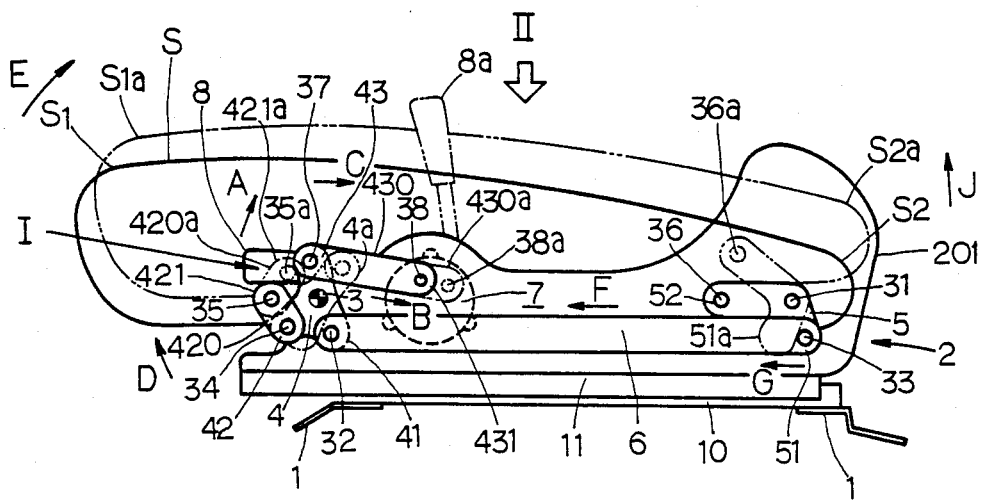
FIG. 1 is a side elevation of an embodiment according to the present invention.

Referring first to FIG. 1, a conventional lower track 10 for the seat S is fixed on the vehicle floor 1 by a suitable means to allow for longitudinal adjustment of the seat S. An upper track 11 is slidably mounted on the lower track 10. the upper track 11 has a bracket 2 (inner bracket 200, outer bracket 201) secured onto it and the bracket 2 is designed so that it can be moved forward and backward with respect to the vehicle floor 1, when the upper track 11 is moved. If necessary, the bracket 2 may be fixed onto the vehicle floor 1.

Figure 2:
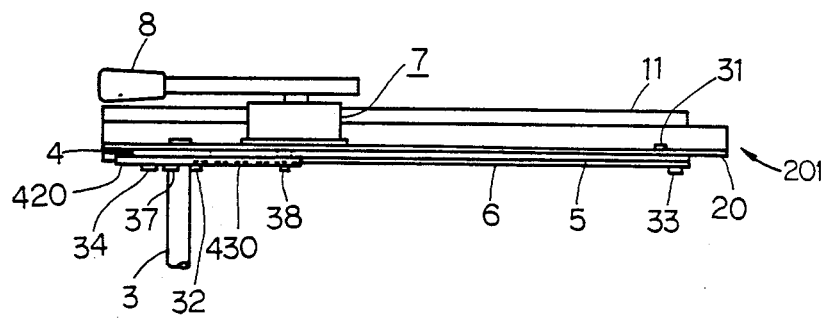
FIG. 2 is a top plan view as viewed from arrow II indicated in FIG. 1.
Figure 8:
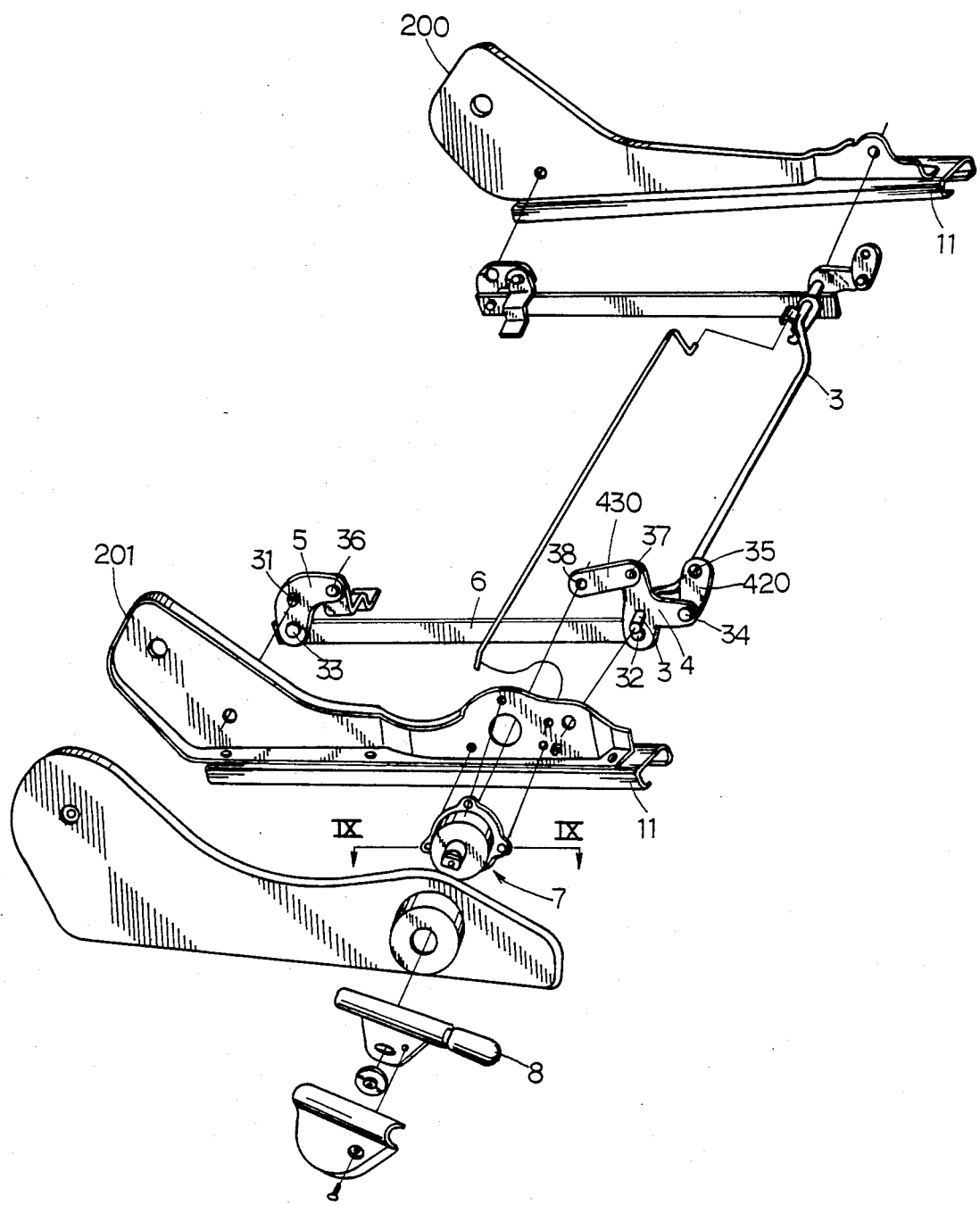
FIG. 8 is an exploded perspective view according to the present invention.
Figure 9:
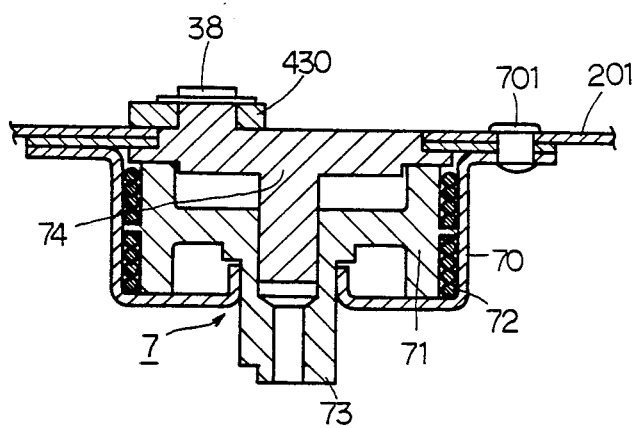
FIG. 9 is a cross-sectional view taken along line VII—VII in FIG. 8.

As seen from FIGS. 2 and 8, which illustrate the right side seat as viewed from the top, the outer bracket 201 and the inner bracket 200 are mounted on a pair of upper tracks 11 fixed separately on the floor 1 (not shown in FIG. 8). In FIG. 2, only the outer bracket 201 is shown. On the front portion of bracket 2, a rotation rod 3 is mounted at a position between the outer bracket 201 and the inner bracket 200. The front links 4 comprising a pair of links installed on the inner and outer sides of seat S, are adapted to be rotatable around rotation rod 3. Rear link 5, comprising a pair of links similarly installed on the inner and outer sides of seat S, are adapted to be rotatable about pin 31 and are mounted on brackets 200, and 201. The construction of the inner bracket 200 is the same as the construction of the outer bracket 201 and the front links 4 and rear links 5 are similarly attached on each bracket. Therefore, only the outer bracket 201 shall be further discussed.

The connecting linkage 6 is provided for joining the end 41 of the front link 4 with the end 51 of the rear link 5. The linkage 6 is attached by pins 32 and 33 to the front link 4 and the rear link 5 respectively, in order to transfer the movement of one link to the other link. The first link 420 of the front link 4 is rotatably supported by pin 34 at the end of front link 4. The pivoting end 421 of the first link 420 is secured to the front portion of the seat frame (not shown, in drawing). The end 52 of rear link 5 is secured to the rear portion of the seat frame.

The aforementioned first link 420 is attached to the end 42 of front link 4 by pin 34. A link similar to the first link 420 may be attached to the rear portion of the seat frame by being secured to an end 52 of rear link 5. The end 52 of the rear link 5 is shown in FIG. 1, however, the actual attaching of a first link 420 to the end 52 is not shown in the drawing.

The second link 430 of the front link 4 is attached to the end 43 of front link 4 by pin 37. The other end 431 of the second link 430 is attached to the anti-back drive coupling 7 by pin 38. The anti-back drive coupling 7, of U.S. Pat. No. 3,149,815, is fixed to side bracket 201. The anti-back drive coupling 7 permits rotation of pin 38 only when the handle 8 is appropriately moved. Therefore, pin 38 cannot be rotated even though the coupling 7 undergoes some type of load. The bi-directional, anti-back drive coupling, as best displayed in FIGS. 1, 2, 3, 8 and 9 and referenced by the numeral 7, is supported by the side bracket 201 which is secured by suitable means to the upper track 11. The coupling 7 includes a cup shaped case 70 which is secured by the machine screw 701 to the side bracket 201. The bracket 201 rotatably receives the input shaft 73 which drivingly connects with the manual handle 8 through an aperture therein. The drum 71, located within the case 70 and acting as a spring retainer, is secured to the input shaft 73, and is provided with a cylindrical wall located in a radially spaced relationship to the inner wall of the case 70. A helical coil spring 72 fits within the annular space between the case 70 and the drum 71, with the coils of the spring in frictional engagement with the inner wall of the case 70. The ends of the spring 72 are bent radially inward and join with an axially extending slot in the drum 71. The bent ends are located in an adjacently spaced relationship with the respective radial walls of the slot. The output shaft 74 passes into the case 70 through an aperture. The end of the output shaft 74 is rotatably supported in a bearing hole formed in the end of the input shaft 73.

In this embodiment, the anti-back drive coupling 7 is joined with the front link 4. However, the coupling 7 may be located toward the rear of the seat and thereby joined with the rear link 5.

Figure 4:
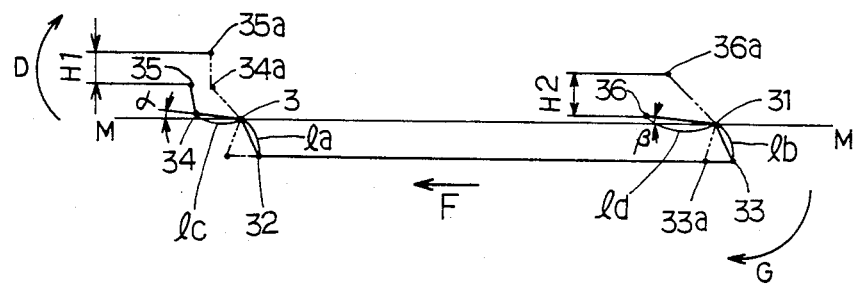
FIG. 4 is a schematic illustration indicating the actuation of the linkage means.

Referring next to FIG. 4, a schematic drawing illustrates the movement of the front link 4 and the rear link 5 from the solid line position to the phantom line position when torque is applied by the manual handle 8. The reference la indicates the effective length of the link between the rotation center 3 and the pin 32. The reference lb indicates the effective length of the link between the rotation center 31 and the pin 33.

Line M—M is a line parallel to the connecting link 6. Angle $\alpha$ is the angle defined between line M—M and the line extending from point 3 to 34. Angle $\beta$ is an angle defined between line M—M and the line extending from point 31 to point 36.

Figure 5:
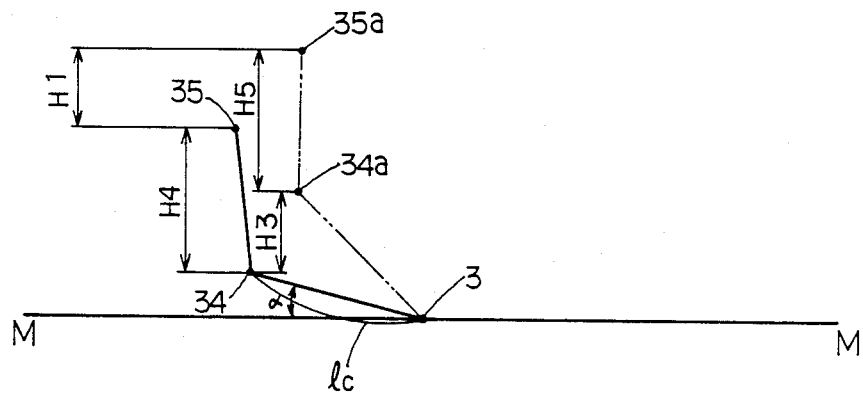
FIG. 5 is an enlarged detailed view of a left portion of FIG. 4.

The length la is adapted to be the same as the length lb. Next, lc is the effective length between the rotation center 3 of front link 4 and the pin 34. And ld is the effective length between pin 31 of the rear link 5 and pin 36. The left portion of FIG. 4 is enlarged in FIG. 5. Given that the length la is equal to the length lb, the rotation angle defined between the link 3-32 and the link 3-34 is equal to the rotation angle defined between the link 31-33 and the link 31-36. This results in:

Triangle 34-3-34$a$ = Triangle 36-31-36$a$

However, when $\alpha$ is equal to $\beta$ and the length lc is shorter than the length ld, the height H3 is less than height H2. Because the vertical height H4 of link 34-35 is nearly equal to the vertical height H5 of the link 34$a$-35$a$, the height H1 is nearly equal to the height H3. Furthermore, when angle $\alpha$ is nearly equal to angle $\beta$, height H3 is less than height H2. Therefore, if the link system is designed so that height H1 is smaller than height H2, with $\alpha$ being nearly equal to $\beta$ and lc being shorter than ld, then H1 is shorter than H2.

In this embodiment, the first link 420 is connected with front link 4, however, the first link 420 may be connected with the rear link 5 provided that the effective length of rear link is longer than that of front link in order to create a differential between the lift values at the longitudinal points on the seat.

When in operation, in order to adjust the seat vertically, the handle 8 is lifted upwardly from the solid line position in FIGS. 1 and 2 to the phantom line position 8$a$, as indicated by arrow A. This results in a movement of the second link 430 from the solid line position in FIG. 3 to the phantom line position 430$a$.

Figure 3:
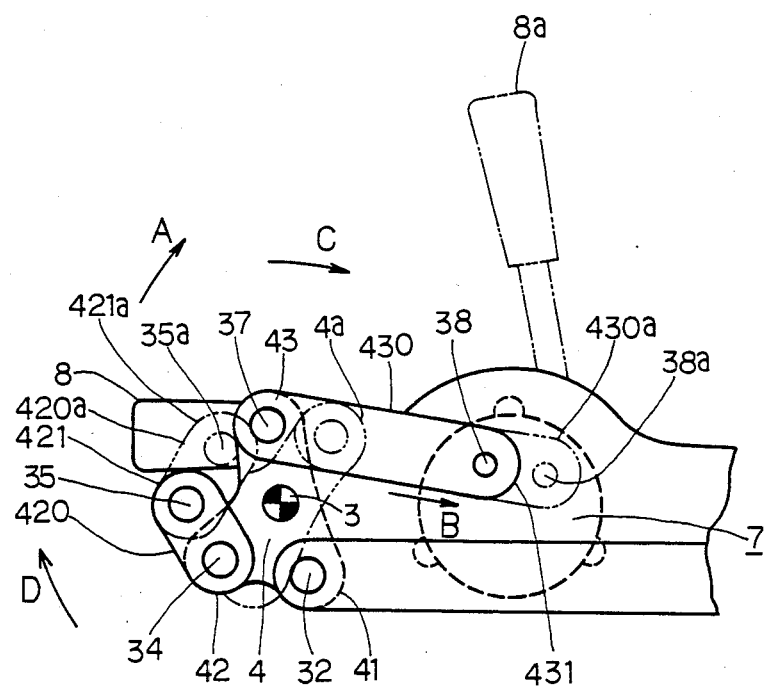
FIG. 3 is an enlarged detailed view of the front link device as shown in FIG. 1.

Through the movement of the second link 430 in the indicated direction C in FIG. 3, the front link 4 is rotated from the solid line position to the phantom line position 4$a$.

Further, the first link 420, whose end is supported by pin 34, is rotated from the solid line position in FIG. 3 to the phantom line position 420$a$ when the handle 8$a$ is moved in direction C. The pin 35, which is secured to the front portion of the seat, is displaced to the phantom line position 35$a$ by the movement of the first link 420. This results in lifting the front portion S1 of seat S from the solid line position in FIG. 1 to the phantom line position S1$a$ moved in the direction labeled E.

Moreover, a connecting linkage 6, which is secured to one end 41 of the front link 4 by pin 32, is designed to be moved in the direction F in FIG. 4, resulting in the end 51 of the rear link 5 being rotated from the solid line position in FIG. 1 to the phatom line position 51$a$.

Hence, the rear portion S2 of the seat S is lifted to the phantom line position S2$a$ in the direction J in FIG. 1.

According to the embodiments of the present invention, a characteristic of this device is that there is a differential in the amount of lift created at the longitudinal points of the seat. That is, the lifting value of the front portion of the seat is smaller than that of the rear portion of the seat. To achieve the above results, the effective length ld of the rear link 5 must be longer than the effective length lc of the front link 4.

As shown in FIG. 4, the displaced position of pin 36 of the rear link 5, represented by the phantom line position 36$a$ and the displaced position of pin 35 of the front link 4, represented by the phantom line position 35$a$, are not equivalent. The displaced value H2 is larger than the displaced value H1, thereby resulting in the rear portion of seat S2 being lifted more than the front portion S1 of the seat S in accordance with the vertical seat adjustment.

Figure 6:
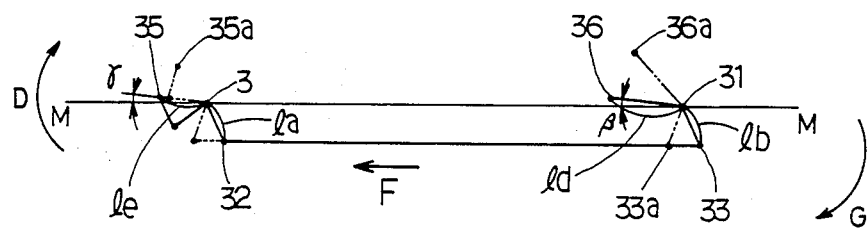
FIG. 6 is another schematic illustration indicating the actuation of the linkage means.

Referring next to FIG. 6, another schematic drawing is illustrated which indicates the movement of the front link and the rear link. The left portion of FIG. 6 is enlarged in FIG. 7. The references la, lb, ld and $\beta$ are the same as those of FIG. 4. Reference $\gamma$ is an angle defined between the link 3-35 and the horizontal line M—M. The length le is the distance between point 3 and point 35. The lifting device is designed in such a way so that when the link 34-35 is displaced to its 34$a$-

35a lifted position, the displacement is symmetrical about a vertical line to decrease unnecessary play in the seat.

Therefore, when la is equal to lb, the rotational angle defined between link 3-32 and link 3-34 is the same as that defined between link 31-33 and link 31-36.

Figure 7:
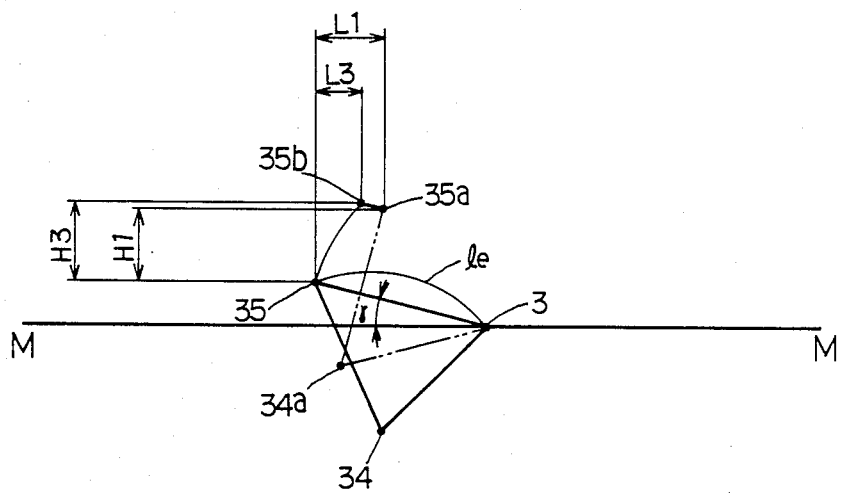
FIG. 7 is an enlarged detailed view of the left part of FIG. 6.

Moreover, in order for the triangle 3-35-34 to be congruent to triangle 36-31-36a, the angle defined between line 35-3 and line 3-35b in FIG. 7 is the same as that defined between line 36-31 and line 31-36a in FIG. 4.

Under these afore-mentioned conditions and provided that $\gamma$ is equal to $\beta$ and le is shorter than ld, the height H3 is less than the height H2. Because L3, which is the horizontal distance between 35 and 35b, is shorter than L1, the link 34a-35b will be rotated to the position 34a-35a so that L3 will be nearly equal to L1. As link 34a-35a is adjusted so that it approaches a vertical line, with regard to horizontal line M—M, H1 will be nearly equal to H3.

Further, when $\gamma$ is nearly equal to $\beta$, H3 will be shorter than H2. Therefore, H1 will be shorter than H2 when $\gamma$ is nearly equal to $\beta$ and le is shorter than ld.

While the present invention has been described in its preferred embodiments, it is to be understood that the invention is not limited thereto but may be otherwise embodied within the scope of the following claims.

What is claimed is:

1. A seat adjusting means for adjusting a height of a seat cushion, which is positioned between the seat cushion and a bracket located at a side of the seat cushion, comprising:
    a first link having a front pivot point and a first, a second and a third peripheral rotational points, the front pivot point of said first link being pivotally mounted to a front portion of the bracket, and wherein said first link has a first predetermined length defined between the front pivot point and the first peripheral rotational point;
    an auxiliary link having an end and an another end, the end of said auxiliary link being pivotally connected to the first peripheral rotational point of said first link, and the another end of said auxiliary link being pivotally connected to a front side portion of the seat cushion;
    a second link having an end and an another end, the end of said second link being pivotally connected to the second peripheral rotational point of said first link;
    a third link having an end and an another end, the end of said third link being pivotally connected to the third peripheral rotational point of said first link;
    a fourth link having a rear pivot point and a fourth and a fifth peripheral rotational points, the rear pivot point of said fourth link being pivotally mounted to a rear portion of the bracket, the fourth peripheral rotational point being pivotally connected to a rear side portion of the seat cushion, and the fifth peripheral rotational point being pivotally connected to the another end of said third link, and wherein said fourth link has a second predetermined length defined between the rear pivot point and the fourth peripheral rotational point, the second predetermined length of said fourth link being longer than the first predetermined length of said first link;
    a bi-directional, anti-back drive coupling having an input shaft and an output shaft, the output shaft being pivotally connected to the another end of said second link; and
    a driving means connected to the input shaft of said bi-directional, anti-back drive coupling for rotating the input shaft in either direction.

2. The seat adjusting means of claim 1, wherein a third predetermined length is defined between the front pivot point of said first link and the another end of said auxiliary link, the third predetermined length being shorter than the second predetermined length of said fourth link when the seat cushion is adjusted to a lifted position.

3. The seat adjusting means of claim 1, wherein said driving means comprises a manually actuable handle connected to the input shaft for applying torque thereto.

4. The seat adjusting means of claim 1, further comprising:
    an another bracket on another side of the seat cushion;
    a fifth link having an another front pivot point, and a sixth and seventh peripheral rotational points, the another front pivot point of said fifth link being pivotally mounted to a front portion of the another bracket, and wherein said fifth link has a fourth predetermined length defined between the another front pivot point and the sixth peripheral rotational point thereof, the fourth predetermined length being the same length as the first predetermined length of said first link.
    an another auxiliary link having an end and an another end, the end of said another auxiliary link being pivotally connected to the sixth peripheral rotational point of said fifth link, and the another end of said second auxiliary link being pivotally connected to a front side portion of the another side of the seat cushion;
    a sixth link having an end and an another end, the end of said sixth link being pivotally connected to the seventh peripheral rotational point of said fifth link;
    a seventh link having an another rear pivot point and an eighth and a ninth peripheral rotational points, the another rear pivot point of said seventh link being pivotally mounted to a rear portion of the another bracket, the eighth peripheral rotational point being pivotally connected to a rear side portion of the another side of the seat cushion, and the ninth peripheral rotational point being pivotally connected to the another end of said sixth link, and wherein said seventh link has a fifth predetermined length defined between the another rear pivot point and the eighth peripheral rotational point, the fifth predetermined length being the same length as the second predetermined length of said fourth link; and
    a rod connecting the front pivot point of said first link to the another front pivot point of said fifth link to transmit movements of said first link to said fifth link.

5. A seat adjusting means for adjusting a height of a seat cuchion, which is positioned between the seat cushion and a bracket located at a side of the seat cushion, comprising:
    a first link having a front pivot point and a first, a second and a third peripheral rotational points, the front pivot point of said first link being pivotally mounted to a front portion of the bracket and the first peripheral rotational point being pivotally connected to a front side portion of the seat cushion, and wherein said first link has a first predetermined length defined between the front pivot point and the first peripheral rotational point;

a second link having an end and an another end, the end of said second link being pivotally connected to the second peripheral rotational point of said first link;

a thirk link having an end and an another end, the end of said third link being pivotally connected to the third peripheral rotational point of said first link;

a fourth link having a rear pivot point and a fourth and a fifth peripheral rotational points, the rear pivot point of said fourth link being pivotally mounted to a rear portion of the bracket, and the fifth peripheral rotational point being pivotally connected to the another end of said third link, and wherein said fourth link has a second predetermined length defined between the rear pivot point and the fourth peripheral rotational point, the second predetermined length of said fourth link being longer than the first predetermined length of said first link;

an auxiliary link having an end and an another end, the end of said auxiliary link being pivotally connected to the fourth peripheral rotational point of said fourth link, and the another end of said auxiliary link being pivotally connected to a rear side portion of the seat cushion;

a bi-directional, anti-back drive coupling having an input shaft and an output shaft, the output shaft being pivotally connected to the another end of said second link; and a driving means connected to the input shaft of said bi-directional, anti-back drive coupling for rotating the input shaft in either direction.

6. The seat adjusting means of claim 5, wherein a third predetermined length is defined between the rear pivot point of said fourth link and the another end of said auxiliary link, the third predetermined length being longer than the first predetermined length of said first link when the seat cushion is adjusted to a lifted position.

7. The seat adjusting means of claim 5, wherein said driving means comprises a manually actuable handle connected to the input shaft for applying torque thereto.

8. The seat adjusting means of claim 5, further comprising:

an another bracket on another side of the seat cushion;

a fifth link having an another front pivot point, and a sixth and a seventh peripheral rotational points, the another front pivot point of said fifth link being pivotally mounted to a front portion of the another bracket and the sixth peripheral rotational point being pivotally connected to a front side portion of the another side of the seat cushion, and wherein said fifth link has a fourth predetermined length defined between the another front pivot point and the sixth peripheral rotational point, the fourth predetermined length being the same length as the first predetermined length of said first link;

a sixth link having an end and an another end, the end of said sixth link being pivotally connected to the seventh peripheral rotational point of said fifth link;

a seventh link having an another rear pivot point and an eighth and a ninth peripheral rotational points, the another rear pivot point of said seventh link being pivotally mounted to a rear portion of the another bracket and the ninth peripheral rotational point being pivotally connected to the another end and said sixth link, and wherein said seventh link has a fifth predetermined length defined between the another rear pivot point and the eighth peripheral rotational point, the fifth predetermined length being the same length as the second predetermined length of said fourth link;

an another auxiliary link having an end and an another end, the end of said another auxiliary link being pivotally connected to the eighth peripheral rotational point of the seventh link, and the another end of said another auxiliary link being pivotally connected to a rear side portion of the another side of the seat cushion; and a rod connecting the front pivot point of said first link to the another front pivot point of said fifth link to transmit movements of said first link to said fifth link.

* * * * *